United States Patent
Sabih (10) Patent No.: US 7,107,393 B1
(45) Date of Patent: Sep. 12, 2006

(54) SYSTEMS AND METHOD FOR TRANSFERRING DATA ASYNCHRONOUSLY BETWEEN CLOCK DOMAINS

(75) Inventor: Sabih Sabih, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 539 days.

(21) Appl. No.: 10/402,702

(22) Filed: Mar. 28, 2003

(51) Int. Cl.
    *G06F 12/02* (2006.01)
(52) U.S. Cl. ..................................... 711/109
(58) Field of Classification Search ............... 711/167, 711/168, 169, 100, 101, 103, 104, 111, 112, 711/154, 105, 109; 713/375, 400; 714/776, 714/719; 375/372, 371
    See application file for complete search history.

(56) References Cited

U.S. PATENT DOCUMENTS

| | | | |
|---|---|---|---|
| 4,672,609 A * | 6/1987 | Humphrey et al. | 714/719 |
| 5,509,038 A | 4/1996 | Wicki | 375/371 |
| 5,915,107 A * | 6/1999 | Maley et al. | 713/400 |
| 6,033,441 A * | 3/2000 | Herbert | 713/375 |
| 6,049,887 A | 4/2000 | Khandekar et al. | 713/503 |
| 6,055,285 A * | 4/2000 | Alston | 375/372 |
| 6,057,789 A * | 5/2000 | Lin | 341/61 |
| 6,128,749 A | 10/2000 | McDonnell et al. | 713/600 |
| 6,163,545 A | 12/2000 | Flood et al. | 370/465 |
| 6,333,646 B1 * | 12/2001 | Tsuzuki | 327/47 |
| 6,359,479 B1 | 3/2002 | Oprescu | 327/141 |
| 6,366,530 B1 * | 4/2002 | Sluiter et al. | 365/240 |
| 6,366,991 B1 | 4/2002 | Manning | 711/167 |
| 6,396,887 B1 | 5/2002 | Ware et al. | 375/354 |
| 6,424,688 B1 | 7/2002 | Tan et al. | 375/354 |
| 2002/0120902 A1 * | 8/2002 | Brown | 714/776 |

OTHER PUBLICATIONS

Clifford E. Cummings; "Simulation and Synthesis Techniques for Asynchronous FIFO Design"; SNUG San Jose 2002, Rev 1.1; pp. 1-21, Apr. 19, 2002.
U.S. Appl. No. 10/402,706, filed Mar. 28, 2003, Sabih.

* cited by examiner

*Primary Examiner*—Donald Sparks
*Assistant Examiner*—Jared Rutz
(74) *Attorney, Agent, or Firm*—Arthur Joseph Behiel; John J. King (57) ABSTRACT

An asynchronous FIFO buffer communicates data between an input clock domain and a relatively slow output clock domain. The input clock frequency is not an even multiple of the output clock frequency, so the data transfer is asynchronous. The FIFO buffer includes a collection of input registers, a shift register, and some clock-comparison and write logic that controls the flow of data into, out of, and between these registers. The input data is loaded into the input registers in synchronization with the input clock. The clock-comparison and write logic compares the input and output clock signals and moves the data from the input registers to the shift register at an address value that may vary based on the result of the comparison of the input and output clock signals, skipping write cycles as necessary to avoid shifting data into the shift register faster than the data is shifted out.

20 Claims, 13 Drawing Sheets

SYSTEMS AND METHOD FOR TRANSFERRING DATA ASYNCHRONOUSLY BETWEEN CLOCK DOMAINS

BACKGROUND

Digital logic circuits must sometimes coordinate operations across a synchronization boundary between two different clock domains operating at different clock speeds. In particular, a first-in-first-out (FIFO) memory is sometimes used to transfer data, commands and/or other information between the two different clock domains. Data is stored into the FIFO memory in a "write" clock domain at a write clock speed and read from the FIFO memory in a "read" clock domain at a read clock speed.

A FIFO memory write pointer, typically a register, is maintained in the write clock domain to point to the FIFO memory location in which data can be stored into the FIFO memory. A FIFO memory read pointer, also typically a register, is maintained in the read clock domain to point to the FIFO memory location from which data can be read from the FIFO memory. The FIFO memory read pointer and the FIFO memory write pointer are compared to each other to generate status information for the FIFO memory. Typically, the status information includes an "empty" signal, which indicates that all FIFO memory locations are empty, or no valid data is present (ss). A "full" (No room for additional information) signal indicates that all FIFO memory locations are full, or contain valid data. The empty signal is used to determine whether valid (ss)data can currently be read from the FIFO memory. The full signal is used to determine whether new (ss)data can currently be added to the FIFO memory.

Using the full and empty signals, a synchronization mechanism is implemented in the FIFO memory to prevent "overrun" and "underrun" conditions when writing to and reading from the FIFO memory. An overrun condition occurs when data is added to a FIFO memory location and overwrites previous data that has not yet been read from that FIFO memory location. An underrun condition occurs when data is read from a FIFO memory location before valid data has been stored into that FIFO memory location. The FIFO memory operations are typically synchronized by passing "handshaking" signals between the write clock domain and the read clock domain to request, acknowledge and reject data operations on the FIFO memory.

Pointer management and handshaking are complex functions that may be difficult to accomplish using standard cells. Moreover, handshaking can introduce latency, slowing data translation. There is therefore a need for an asynchronous FIFO design that can be made from standard cells, and that is consequently easily scalable between processes, and that simplifies pointer management.

SUMMARY

The present invention is directed to an asynchronous FIFO buffer that communicates data from a fast clock domain synchronized to a relatively fast input clock signal to a slow clock domain synchronized to a relatively slow output clock signal. The input frequency is not an even multiple of the output frequency, so the data transfer is asynchronous. The FIFO buffer does not require handshaking or complex pointer management circuitry, and may be easily implemented using standard cells. Also advantageous, the reduction in design and process (ss)complexity saves die (ss)area and reduces power consumption.

An exemplary embodiment of the present invention includes the FIFO buffer having a collection of input registers, a shift register, and some clock-comparison and write logic that controls the flow of data into, out of, and between these registers. Each of a sequence of input datum is loaded into one of the input registers in synchronization with the input clock. The clock-comparison and write logic compares the input and output clock signals and, based on the result, writes data from the input registers into the shift register. According to one embodiment, the clock-comparison and write logic provides an address pointer to the shift register, the address Pointer having a address value that varies based on the comparing of the input and output clock signals.

Due to the difference between input and output clock frequencies, the shift register may not shift out data fast enough to accommodate new data from the input registers; in such cases, the clock-comparison and write logic skips a write cycle to the shift register, allowing an additional datum to load into the input registers. The additional datum is then transferred to the shift register during the next write cycle. The clock-comparison and write logic thus matches the input and output data rates of the shift register. In one embodiment, the clock-comparison and write logic includes a state machine that tracks the history of data transfers into and out of the shift register.

This summary does not limit the invention, which is defined instead by the appended claims.

DETAILED DESCRIPTION

Figure 1:
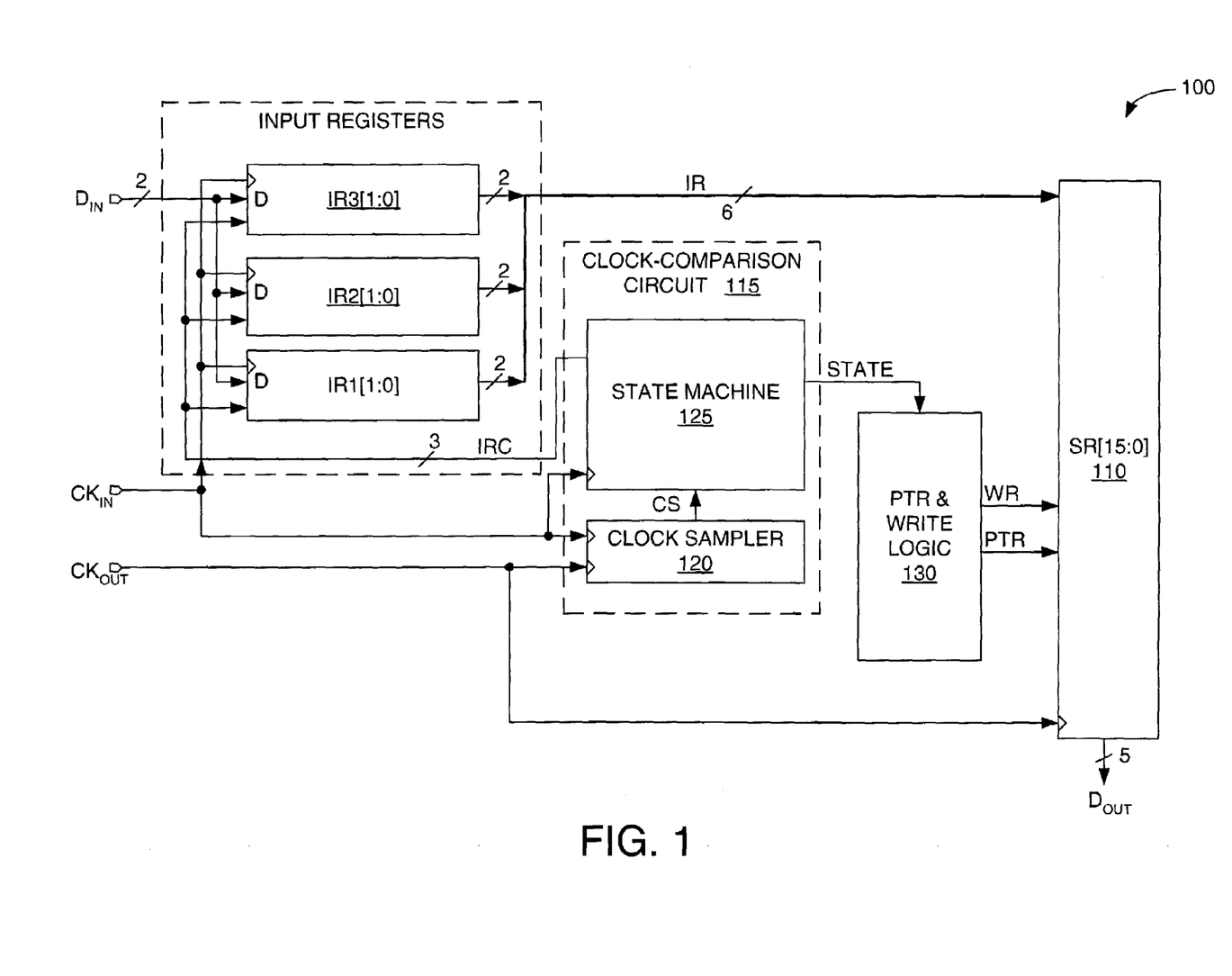
FIG. 1 depicts an asynchronous first-in-first-out (FIFO) buffer 100 in accordance with one embodiment.

FIG. 1 depicts an asynchronous first-in-first-out (FIFO) buffer 100 in accordance with one embodiment of the invention. FIFO buffer 100 captures a stream of input data $D_{IN}$ at a first clock rate $CK_{IN}$ and outputs the same data a second clock rate $CK_{OUT}$. In an illustrative example, the input data $D_{IN}$ is two-bits wide, the output data is five bits-wide, and the ratio of the input clock frequency to the output clock frequency is five over two (i.e., 5/2). The input and output data bandwidths are therefore equivalent (i.e., $D_{IN}CK_{IN}=D_{OUT}CK_{OUT}$) FIFO buffer 100 does not require handshaking or an output pointer, and so avoids much of the complexity of conventional high-performance asynchronous FIFO buffers. Also important, FIFO 100 can be implemented using standard cells, and is therefore easily scalable between device processes.

FIFO buffer 100 includes three two-bit input registers IR1-3 (IR1, IR2, AND IR3), a shift register 110, a clock comparison circuit 115, and some pointer and write logic 130. Clock-comparison circuit 115 directs input registers IR1-3 to capture each two-bit input datum on terminal $D_{IN}$ upon rising edges of input clock $CK_{IN}$. Clock-comparison circuit 115 then, by controlling logic 130, writes the data stored in registers IR1-3 into shift register 110. Register 110 then produces one two-bit output datum on terminal $D_{OUT}$ for each rising edge of output clock $CK_{OUT}$.

Clock comparison circuit 115 synchronizes the loading of data from input registers IR1-3 into shift register 110 with output clock $CK_{OUT}$. Because of the relationship between output clock $CK_{OUT}$ and input clock $CK_{IN}$, input registers IR1-3 will contain either four bits of data (two stored datum in two input registers) or six bits of data (three stored datum in three input registers) between rising edges of output clock $CK_{OUT}$. Clock comparison circuit 115 samples the relatively slow output clock $CK_{OUT}$ with the input clock $CK_{IN}$ to control whether to load four or six bits of data from input registers IR1-3 into shift register 110. Clock comparison circuit 115 additionally works with write logic 130 to track the level of data present in register 110, and consequently knows the appropriate address locations in which to load input data. In this simple example, register 110 includes sixteen single-bit address locations 0000 through 1111.

Clock comparison circuit 115 includes a clock sampler 120 and a state machine 125. Clock sampler 120 samples output clock $CK_{OUT}$ with the relatively fast input clock $CK_{IN}$ and produces a clock-sample output CS on a like-named terminal. (Throughout the present disclosure, signal nodes—e.g., lines, terminals, or pads—and the signals they carry are referred to using like designations; in each case, whether a given reference is to a signal or the corresponding node will be clear from the context.) Clock sample CS is a logic one if output clock $CK_{OUT}$ is a logic one upon a rising edge of input clock $CK_{IN}$ and is a logic zero if output clock $CK_{OUT}$ is a logic zero upon a rising edge of input clock $CK_{IN}$. State machine 125 tracks and controls data transfers into and out of input registers IR1-3, based in part on the clock sample value CS, and adjusts the pointer to shift register 110 as necessary to account for data flow into and out from (ss) of register 110.

Figure 2:
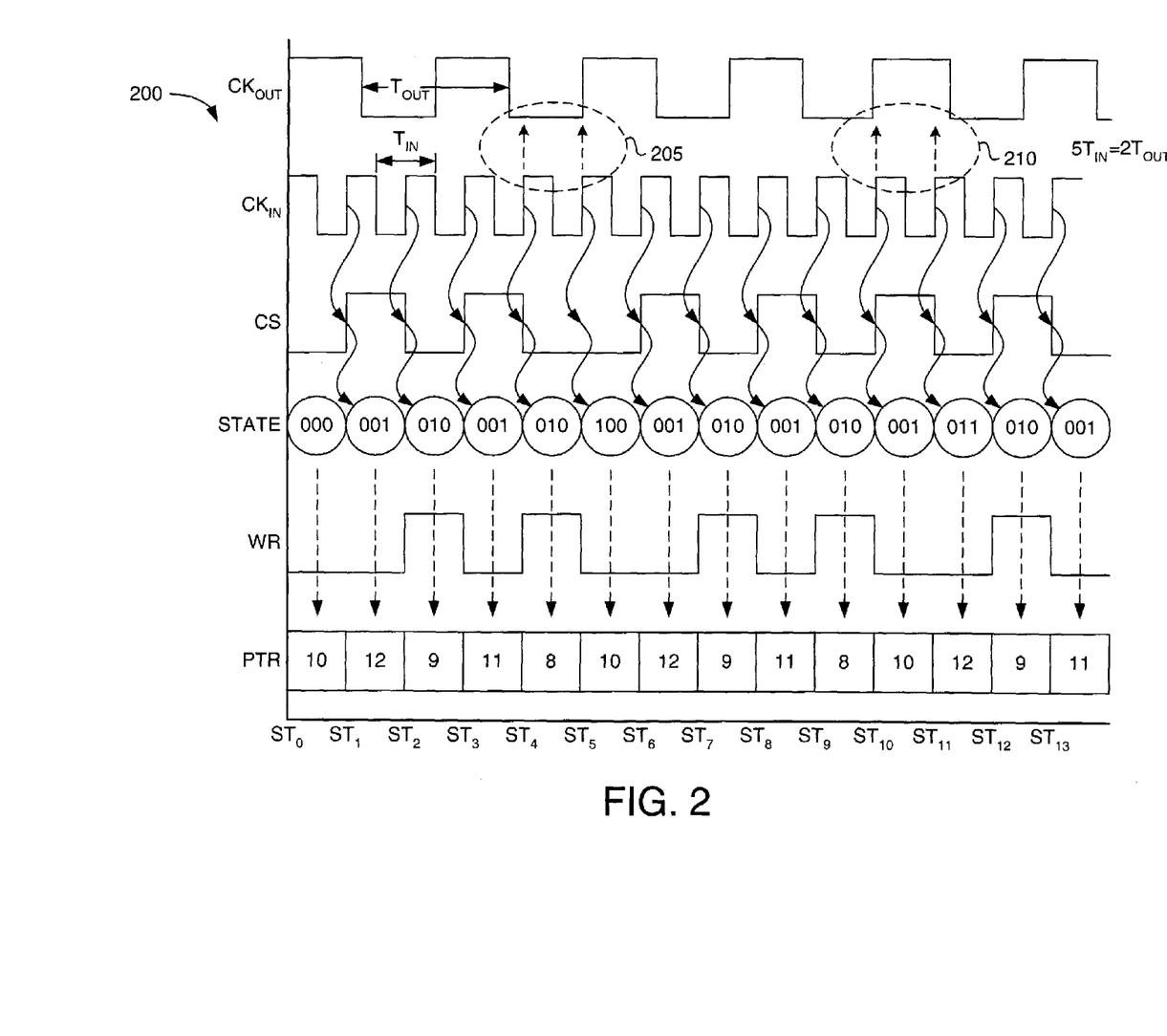
FIG. 2 is a waveform diagram 200 illustrating the operation of FIFO buffer 100 of FIG. 1.

FIG. 2 is a waveform diagram 200 illustrating the operation of FIFO buffer 100 of FIG. 1. Output register 110 produces five bits of output data $D_{OUT}$ on each rising edge of output clock $CK_{OUT}$. One of input registers IR1-3 latches one two-bit input datum on each rising edge of faster input clock $CK_{IN}$. Clock comparison circuit 115 waits for output register 110 to output five bits before loading a new set of data from the input registers into output register 110. Because the input clock frequency is more than double the output clock frequency, more than two input datum will arrive between periods of the output clock. Clock-comparison circuit 115 identifies these events by sampling the output clock with the relatively fast input clock and responds by loading a third input datum into registers IR1-3. Clock-comparison circuit 115 then loads six bits into output register 110 after the next five bits are shifted out. Clock-comparison circuit 115 thus loads either four bits or six bits (two or three input datum) in a manner that produces an average data rate equal to the output data rate from register 110.

Generally, if the output clock is zero on the rising edge of the input clock, clock comparison circuit 115 loads four bits of data into output register 110 and updates the pointer PTR accordingly. Occasionally, however, as noted using an ellipse 205, the faster input clock samples two logic zeros in a row. In this case, output register 110 has produced no output datum since the last time data was loaded in. Clock-comparison circuit 115 therefore stalls the data transfer from input registers IR1 and IR2 into output register 110, and instead loads the next input datum into input register IR3. Clock-comparison circuit 115 then transfers the six bits of input data in registers IR1-3 the next time clock sampler 120 samples a logic zero.

Figure 3:
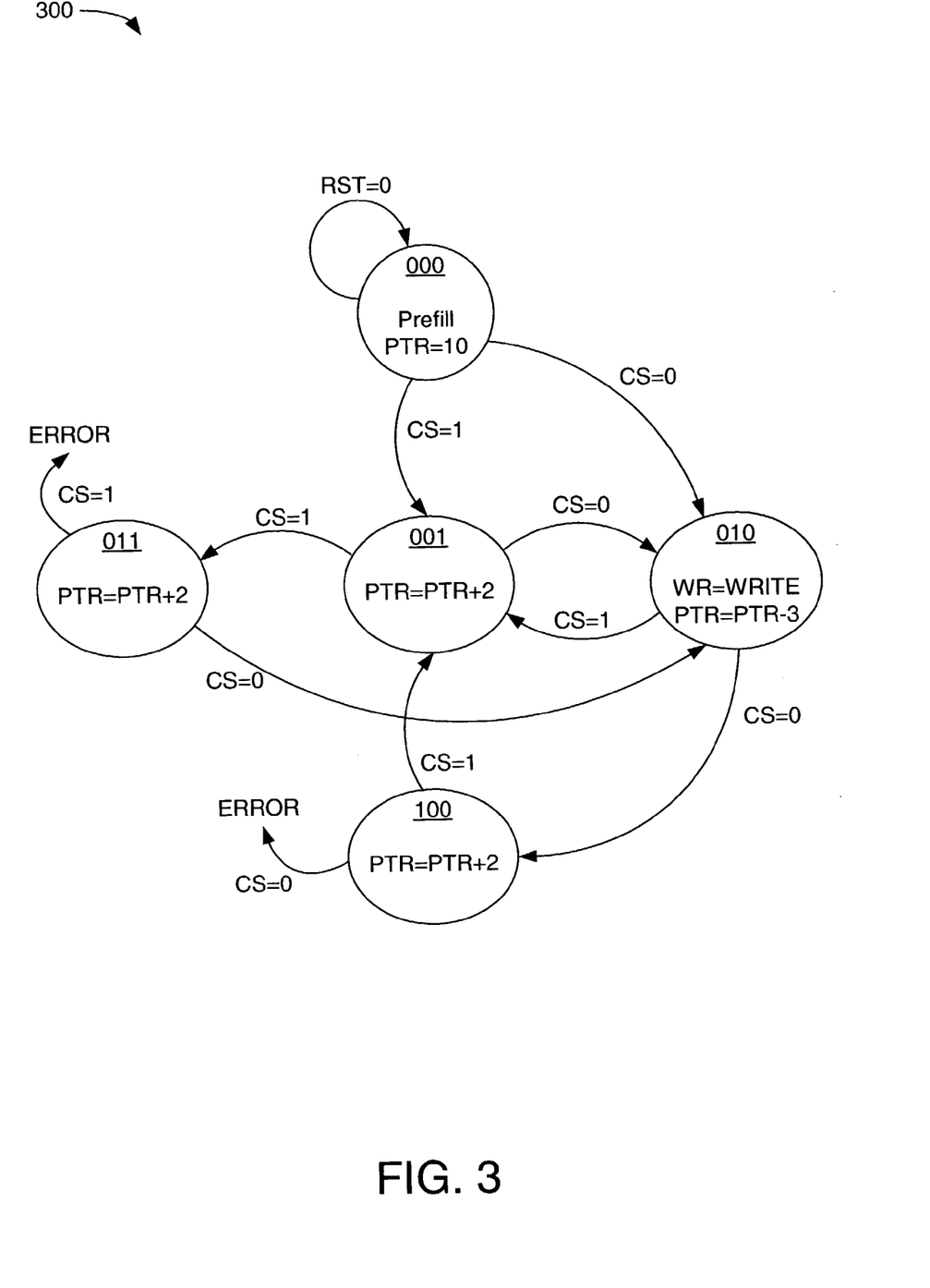
FIG. 3 is a state diagram 300 depicting the operation of state machine 125 of FIG. 1.

FIG. 3 is a state diagram 300 depicting the operation of state machine 125 of FIG. 1, and is used in conjunction with FIGS. 1 and 2 to describe the operation of FIFO buffer 100. In FIG. 2, the process begins at state transition ST0, after which time state machine 125 is in state 000. Some time before or during state 000, register 110 is pre-filled with some amount of data, filling address locations zero through ten (0000–1010) in this example. Pre-filling register 110 allows the amount of data stored in register 110 to fluctuate up and down to account for the required asynchronous data transfer. This aspect of the invention will become more apparent in view of the following discussion.

At state transition ST1, input clock $CK_{IN}$ samples a logic one, causing clock sampler 120 to produce a logic one clock sample CS to state machine 125. As shown in the state diagram of FIG. 3, state machine 125 consequently transitions to state 001. Write logic 130 responds by incrementing the pointer PTR by two. On the same rising edge of input clock $CK_{IN}$, a two-bit input datum on input bus $D_{IN}$ is loaded into one of input registers IR1-3, as determined by an input-register control bus IRC (FIG. 1). Pointer PTR is therefore increased from ten to twelve, even though the received input datum has not yet been written to output register 110.

At state transition ST2, input clock $CK_{IN}$ samples a logic zero, causing clock sampler 120 to produce a logic zero clock sample CS to state machine 125. State machine 125 then transitions to state 010. In this state, write logic 130 asserts write signal WR to write four bits (the contents of two input registers) into output register 110. Recalling that the pointer was increased by two in state 001, the pointer would be increased by two more to reflect the four additional bits; however, the sampled logic zero indicates that five bits were shifted out of register 110, so the two-bit increase is offset by a five-bit reduction, the net resulting being a reduction of three. The pointer PTR is therefore reduced by three, to nine in this case, upon entering state 010.

State machine 125 generally transitions back and forth between states 001 and 010 until clock sampler 120 samples either two zeros or two ones in sequence. The case of two successive zeroes is highlighted by ellipse 205 (FIG. 2). State machine 125 is in state 010 after the first zero sample in ellipse 205 (after state transition ST4). The successive zero sample causes state machine 125 to transition to state 100. Write logic 130 then increases the pointer by two to account for a third two-bit input datum stored in input registers IR1-3. At this point, all three input registers contain input data to be transferred to output register 110, in contrast to the more common case in which input data is transferred two datum at a time. Pointer PTR is therefore increased, in this case from eight to ten. Output buffer 110 outputs five bits before the next rising edge of the input clock, and the six bits of data are written to output register 110 upon the next zero sample.

An ellipse 210 (FIG. 2) highlights the case in which clock sampler 120 samples two successive ones. State machine 125 is in state 001 after the one zero sample in ellipse 205 (after state transition ST10). The successive one sample causes state machine 125 to transition to state 011. Write logic 130 then increases the pointer by two to account for the two bits stored in one of input registers IR1-3. Pointer PTR is therefore increased, in this case from ten to twelve.

Figure 4:
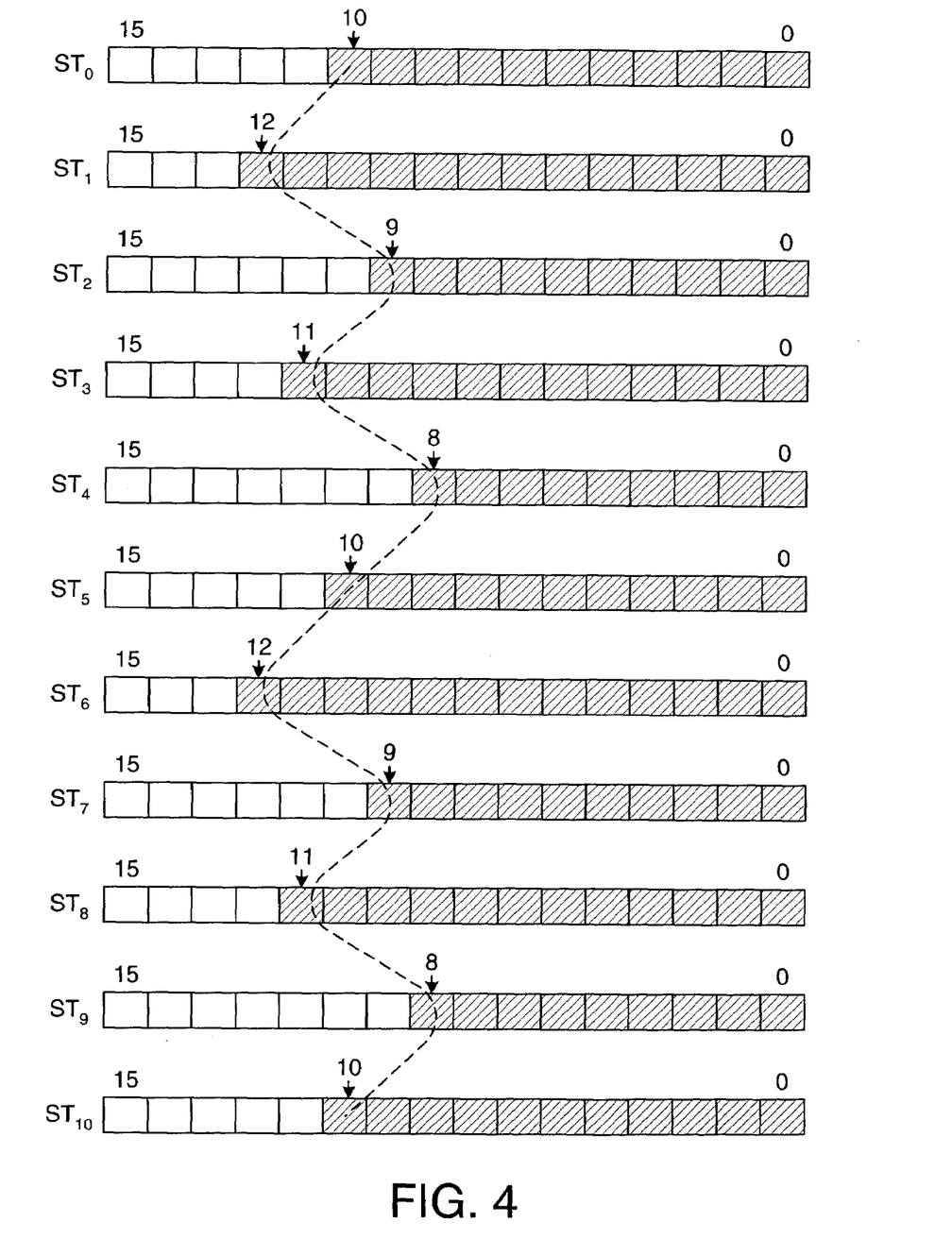
FIG. 4 graphically illustrates the fill levels of register 110 subsequent each state transition ST0–ST10 of FIG. 2.

FIG. 4 graphically illustrates the fill levels of register 110 subsequent each state transition ST0–ST10 of FIG. 2; the same information is noted in line PTR of FIG. 2. As is apparent in the illustration, the fill level of register 110 fluctuates over time. In this ideal case, the fluctuation centers on ten, the pre-fill level. Indeed, the average value over five state transitions is exactly ten (10+12+9+11+8=50, and 50/5=10). The sixteen address locations of register 110 are therefore more than adequate to compensate for the fluctuations produced by the asynchronous operation of FIFO 100. In a real device, however, the relationship between the input and output clocks tends to drift over time, causing the average fill level of FIFO buffer 110 to drift as well. The size of register 110 can easily be expanded as necessary to account for any expected relative frequency drift between the input and output clocks.

Figure 5:
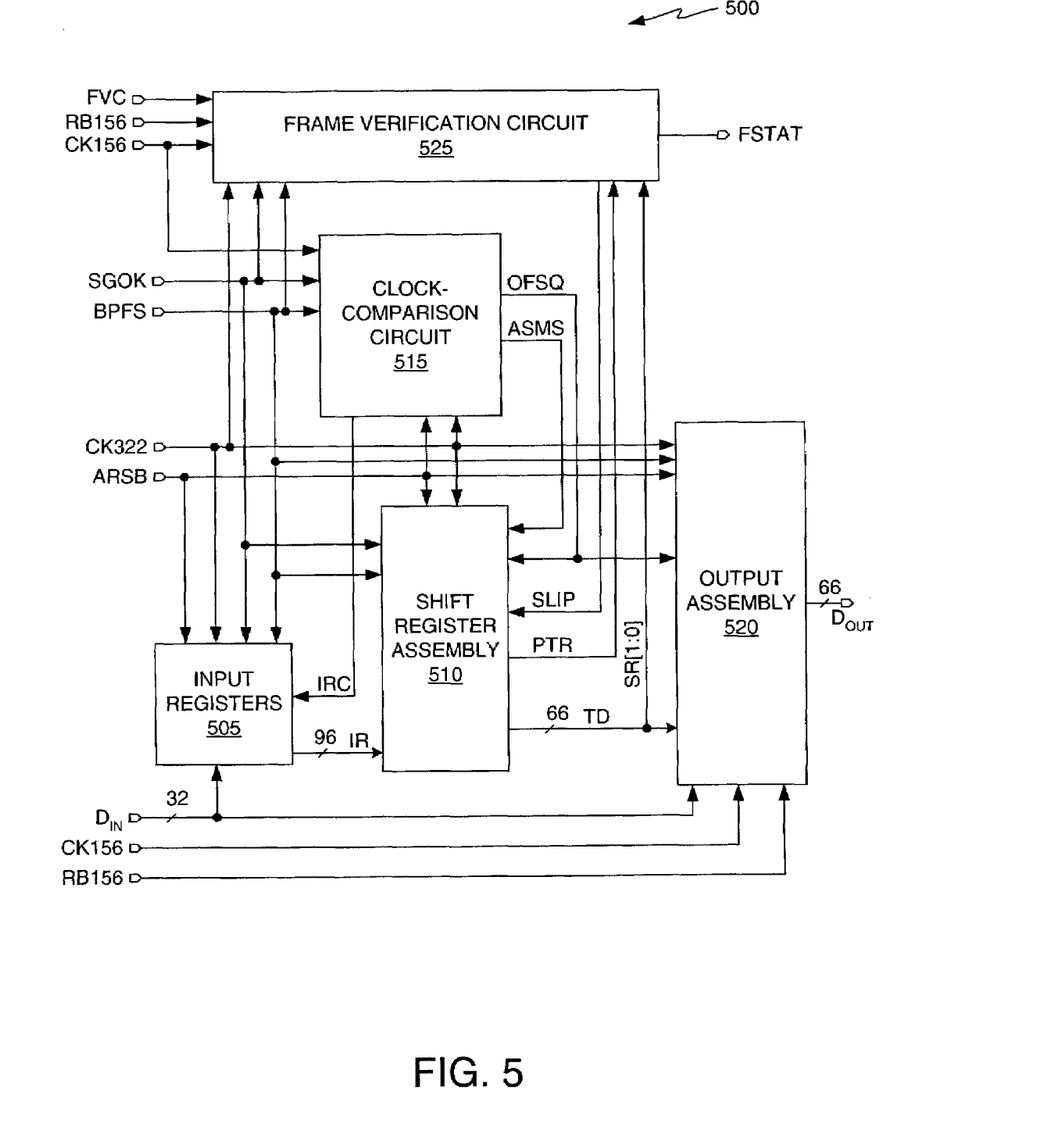
FIG. 5 depicts a frame synchronization system 500 in accordance with another embodiment.

FIG. 5 depicts a frame synchronization system 500 in accordance with another embodiment. Frame synchronization system 500 is functionally similar to FIFO buffer 100 of FIG. 1, but is more complex. System 500 translates thirty-two-bit input data stream $D_{IN}$ in a 322.265625 MHz clock domain (hereafter rounded to 322 MHz) into sixty-six-bit output data frame $D_{OUT}$ at 156.25 MHz (hereafter rounded to 156 MHz). FIFO buffer 500 additionally supports a bypass mode that merely truncates the input data as necessary to account for differences in input data stream and output data frame width. The 156 MHz clock can be derived from the 322 MHz clock, or vice versa, using a conventional phase-lock loop or delay-lock loop (not shown).

Frame synchronization system 500 includes a set of input registers 505, a shift register assembly 510, a clock comparison circuit 515, and some output circuitry 520. Input registers 505 and clock-comparison circuit 515 are similar to their counterparts of FIG. 1; the combination of shift register assembly 510 and output assembly 520 provides the functionality of shift register 110 of FIG. 1. System 500 optionally includes frame verification circuitry 525, which conventionally validates whether data being shifted out is a valid data frame and monitors overrun and underrun errors of a shift-register pointer PTR.

Clock comparison circuit 505 compares the 322 MHZ fast clock CK322 and the 156 MHz slow clock CK156 and maintains a state based on past and present clock samples. Successive one or zero samples produce an "off sequence" signal OFSQ in response to successive ones or zeroes. Further, comparison circuit 515 controls input registers 505 via a control bus IRC.

Input registers 505 receive a 32-bit data stream at 322 MHZ on data input terminal $D_{IN}$ and transmit the input data to shift register assembly 510 via a 96-bit data bus IR. Shift register assembly 510 transmits a shift register pointer PTR, which tracks the address of the last valid data bit to frame verification circuit 525, and a 66-bit data frame on a transmitted data bus TD to output assembly 520. Frame verification circuit 525 is a conventional frame synchronization handshake interface that uses off-sequence OFSQ, shift register pointer signal PTR, and a data frame header SR[1:0], the first two bits of data bus TD, to generate handshake signals. The handshake signals include an underrun error signal generated when shift register pointer PTR is less than output data frame, an overrun error signal generated when shift register pointer PTR is equal to the length of shift register, and a valid data signal signifying a valid data frame is being transmitted. Frame verification control bus FVC includes signals required by frame verification circuit 525 for proper operation, while frame verification status bus FSTAT transmits all signals required for interfacing frame synchronization circuit 500 with a system receiving data from output terminal $D_{OUT}$. Frame verification circuit 525 determines data frame validity by inspecting the data frame header SR[1:0]; if the data frame is not valid, frame verification circuit 525 asserts a frame-slip-mode signal SLIP. In slip mode, i.e., when slip-mode signal SLIP is asserted, data transmitted by frame synchronization circuit 500 is discarded.

Output assembly 520 receives data on data bus TD as a 66-bit data frame on the rising edge on fast clock CK322 when slow clock CK156 is a logic one. Output assembly 520 synchronizes the 66-bit data frame to the rising edge of slow clock CK156. Input terminal $D_{IN}$ connects directly to output assembly 520 to support a bypass mode in which input data bypasses frame synchronization.

Figure 6A:
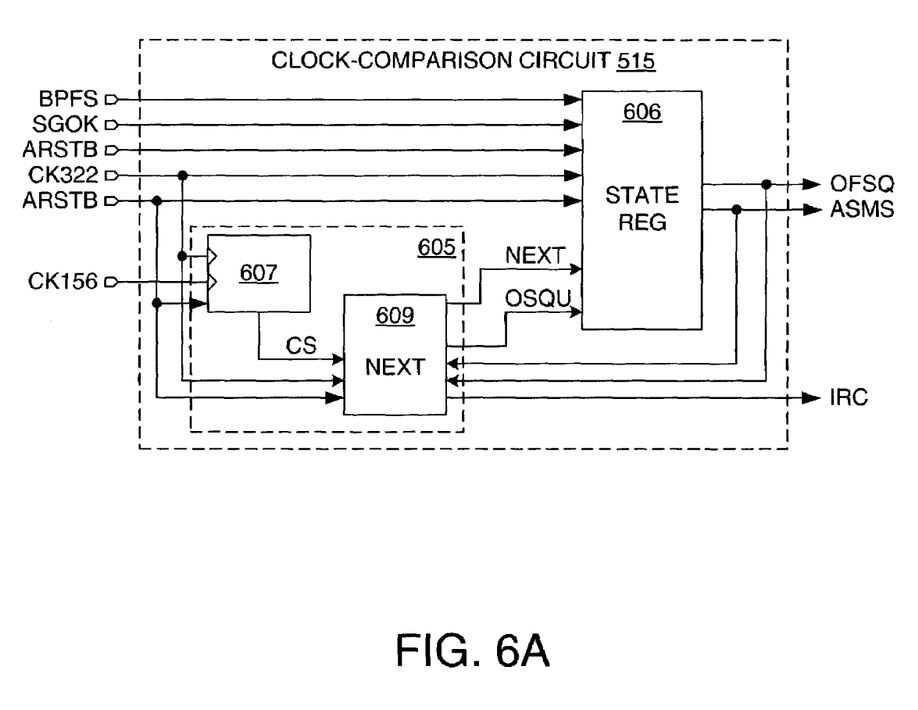
FIG. 6A is a block diagram of an embodiment of clock comparison circuit 515 of FIG. 5.

FIG. 6A is a block diagram of an embodiment of clock comparison circuit 515 of FIG. 5. Circuit 515 includes a next-state generator 605 receiving asynchronous reset signal ARSTB, fast clock CK322, slow clock CK156, off-sequence signal OFSQ, and current state signal ASMS. Next-state generator 605 transmits an out-of-sequence signal OSQU and identifies the next state NEXT to current state register 606. Next-state generator 605 additionally provides input-register control signals to input registers 505 via a control bus IRC.

A clock sampler 607 samples clock signal CK156 with both the rising edge of clock signal CK322 to provide a clock-sample signal CS to next-state logic 609. Signals transmitted by next-state generator 605 transitions on every clock edge of fast clock CK322. Block 606 transmits signals synchronized to the rising edge of fast clock CK322 on current state ASMS and off-sequence OFSQ output terminals. Next state logic 609 employs the clock sample CS, off-sequence signal OFSQ, and the current state ASMS to generate next state NEXT, out-of-sequence OSQU, and input register control IRC signals on respective output terminals NEXT, OSQU and IRC.

Figure 6B:
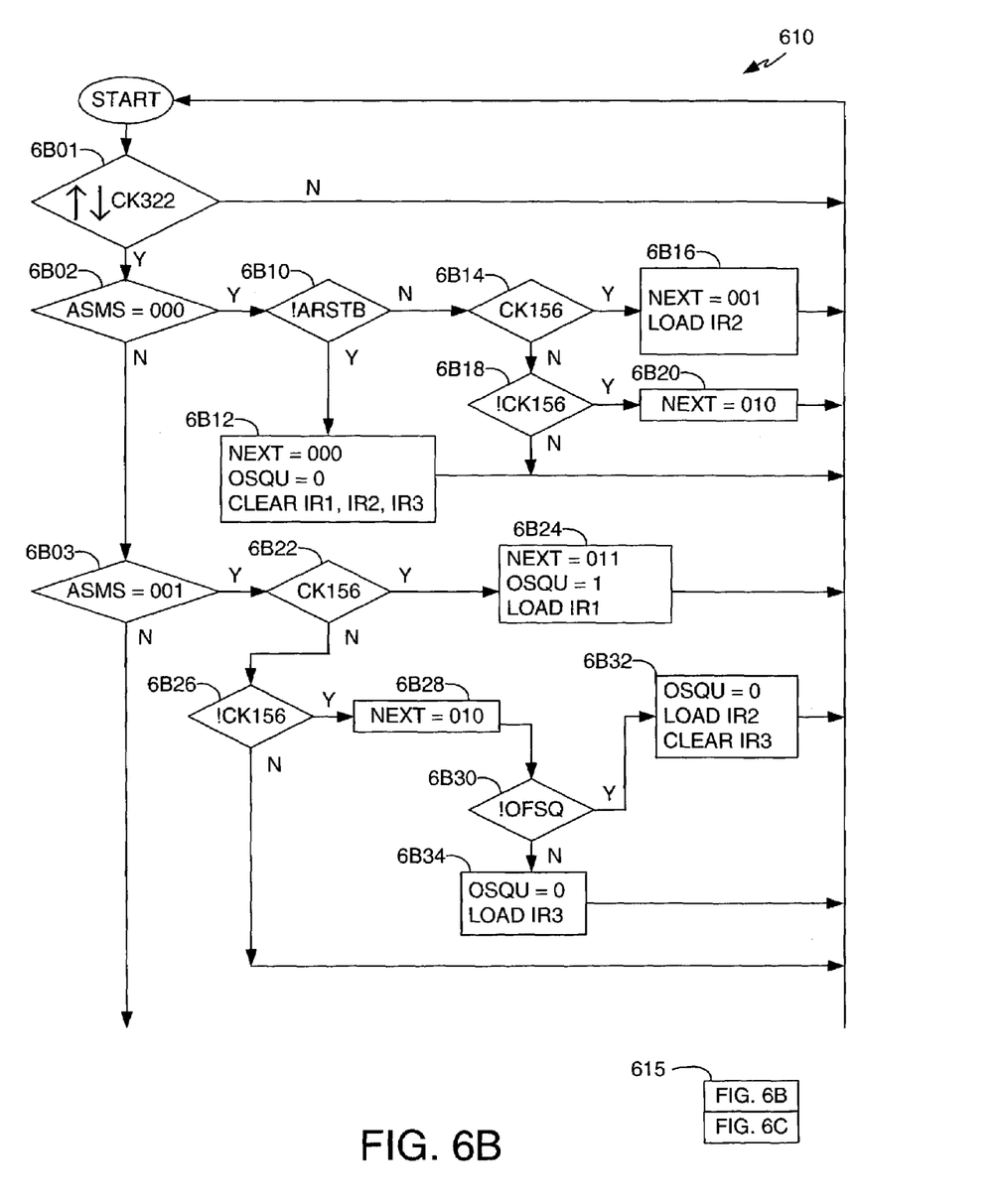
FIGS. 6B and 6C are a flowchart 610 depicting a functional pseudo-code for next-state generator 605 in accordance with one embodiment.
Figure 6C:
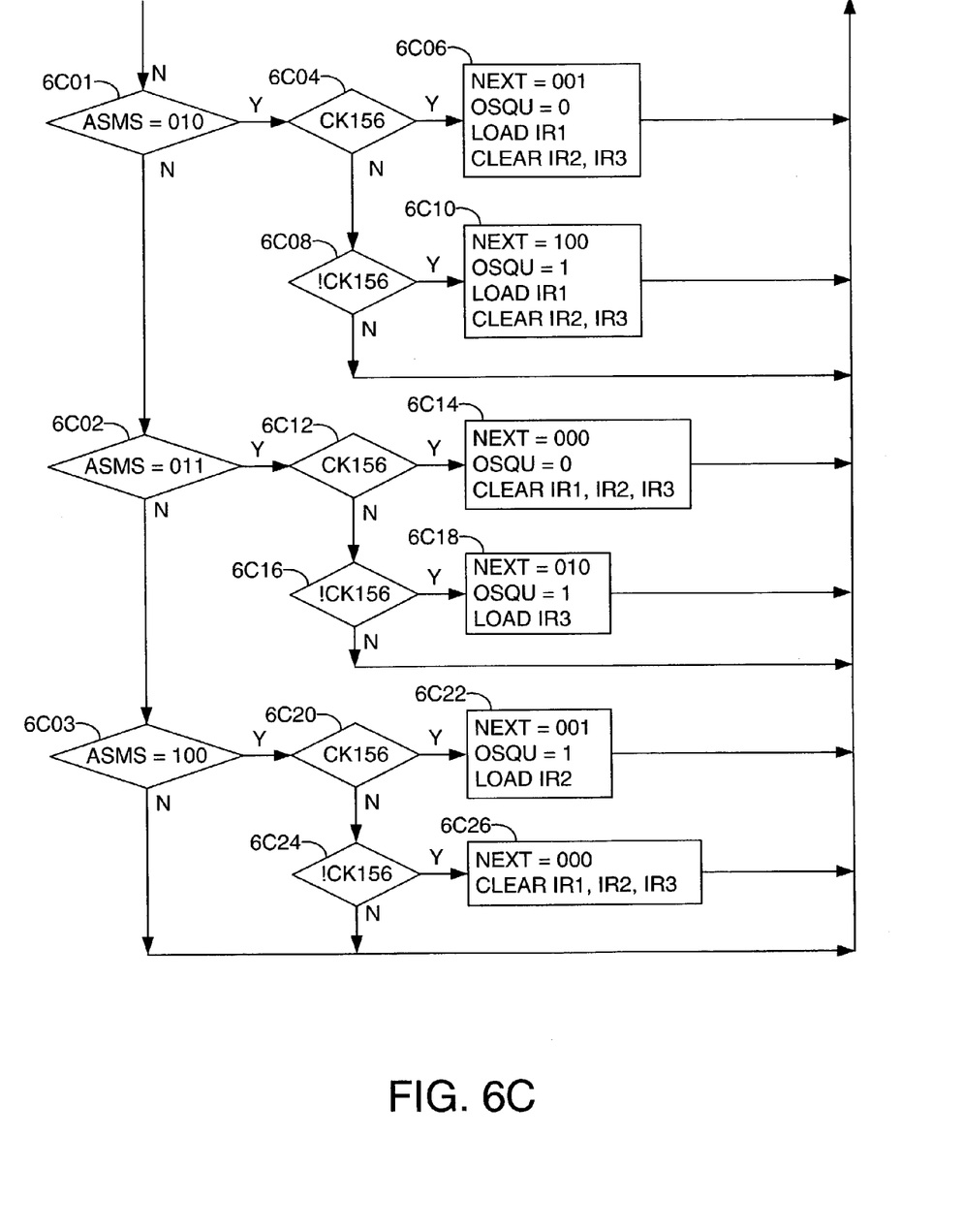

FIGS. 6B and 6C are a flowchart 610 depicting a functional pseudo-code for next-state generator 605 in accordance with one embodiment. Key 615 of FIG. 6B shows the relationship between FIGS. 6B through 6C. Flowchart 610, and other flowcharts discussed below, is derived from verilog™ code describing circuits that perform the illustrated functionality.

Next-state generator 605 is activated by the rising edge on fast clock signal CK322 (decision 6B01), and first looks to the current state ASMS (decisions 6B02, 6B03, 6C01, 6C02, and 6C03). If the current state ASMS is 000 (decision 6B02) and an asynchronous reset signal ARSTB is not asserted (decision 6B10), block 605 resets next state NEXT and out-of-sequence OSQU signals and clears input registers IR1, IR2 and IR3 (step 6B12). When asynchronous reset ARSTB is asserted and slow clock CK156 is asserted (decision 6B14), next-state generator 605 assigns state 001 to next state NEXT and loads second input register IR2 (step 6B16). If slow clock CK156 is not asserted (decision 6B18), block 605 assigns state 010 to next state NEXT (step 6B20).

If current state ASMS is 001 (decision 6B03) and slow clock CK156 is asserted (decision 6B22), block 605 assigns state 011 to next state NEXT, sets out-of-sequence signal OSQU, and loads first input register IR1 (step 6B24). But if slow clock CK156 is not asserted (decision 6B26), block 604 assigns state 010 to next state NEXT (step 6B28). Next, if off-sequence signal OFSQ is not asserted (decision 6B30), block 605 resets out-of-sequence signal OSQU, loads second input register IR2, and clears third input register IR3 (step 6B32). If off-sequence signal OFSQ is asserted, block 605 resets out-of-sequence signal OSQU and loads third input register IR3 (step 6B34).

Moving to FIG. 6C, when current state ASMS is 010 (decision 6C01) and slow clock CK156 is asserted (decision 6C04), next-state generator 605 assigns state 001 to next state NEXT, resets out-of-sequence signal OSQU, loads first input register IR1, and clears input registers IR2 and IR3 (step 6C06); if, however, slow clock CK156 is not asserted (decision 6C08), next-state generator 605 assigns state 100 to next state NEXT, sets out-of-sequence signal OSQU, loads register IR1, and clears input registers IR2 and IR3 (step 6C10).

When current state ASMS is 011 (decision 6C02) and slow clock CK156 is asserted (decision 6C12), next-state generator 605 assigns state 000 to next state NEXT, resets out-of-sequence signal OSQU, and clears input registers IR1, IR2, and IR3 (step 6C14); if, however, slow clock CK156 is not asserted (decision 6C16), next-state generator 605 assigns state 010 to next state NEXT, sets out-of-sequence signal OSQU, and loads register IR3 (step 6C18). Finally, when current state ASMS is 100 (decision 6C03) and slow clock CK156 is asserted (decision 6C20), next-state generator 605 assigns state 001 to next state NEXT, sets out-of-sequence signal OSQU, and loads register IR2 (step 6C22); if, however, slow clock CK156 is not asserted (decision 6C24), next-state generator 605 assigns state 000 to next state NEXT and clears input registers IR1, IR2, and IR3 (step 6C26).

Figure 6D:
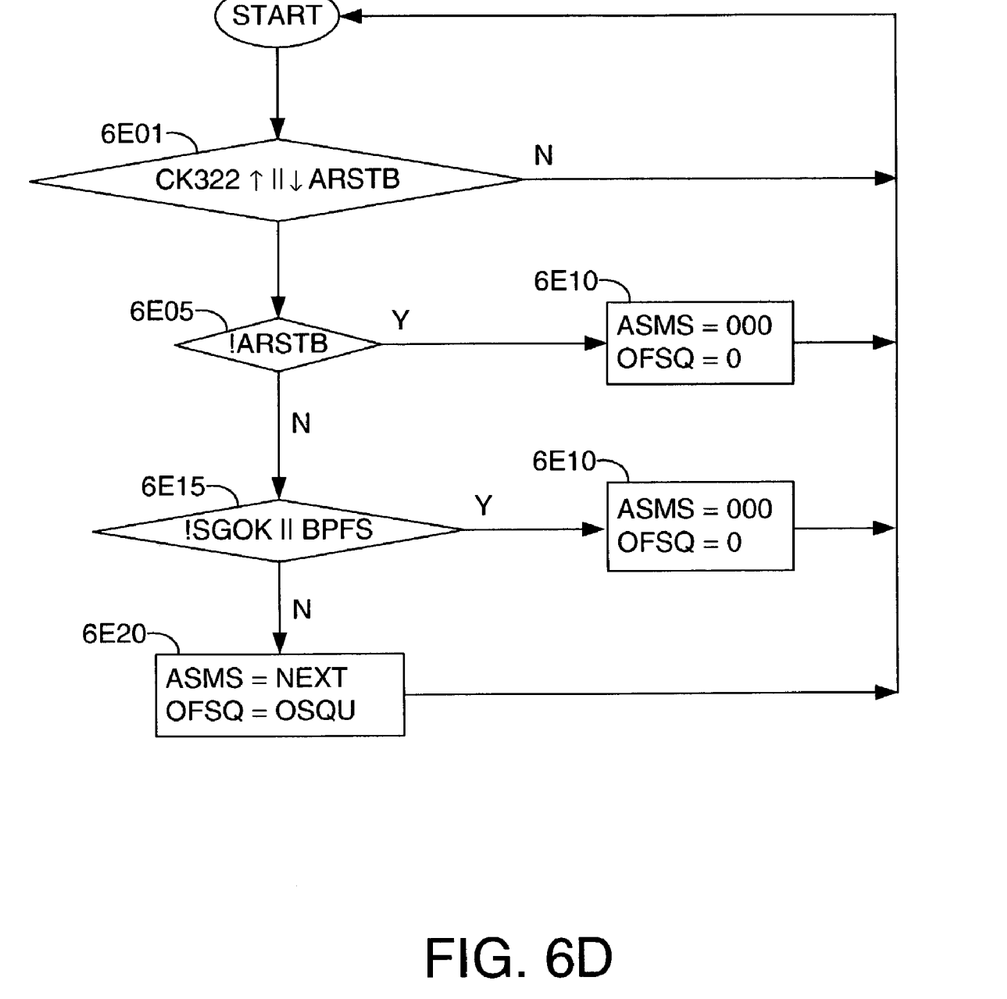
FIG. 6D is a flowchart 630 depicting a functional pseudo-code for current-state register 606 of FIG. 6A in accordance with one embodiment.

FIG. 6D is a flowchart 630 depicting a functional pseudo-code for current-state register 606 of FIG. 6A in accordance with an embodiment that synchronizes next state signal NEXT and out-of-sequence signal OSQU to rising edges of fast clock CK322. Register 606 is activated by rising edges on fast clock CK322 or falling edges on asynchronous reset ARSTB (decision 6E01). Once active, if the active-low reset signal ARSTB is asserted (decision 6E05), register 606 resets current state ASMS and off-sequence OFSQ output signals (steps 6E10). Register 606 also resets current state ASMS and off-sequence output signal OFSQ if reset signal ARSTB is not asserted and either input signal SGOK is not asserted or bypass frame synchronization BPFS signal is asserted (decisions 6E15). If none of the reset conditions is valid, block 606 transmits input signals received on input terminals NEXT and OSQU to respective output terminals ASMS and OFSQ (step 6E20). State register 606 transmits signals ASMS and OFSQ to clock-comparison circuit 515, shift-register assembly 510, and output assembly 520 (FIG. 5), which together use these signals to control the data flow through shift-register assembly 510.

Figure 7A:
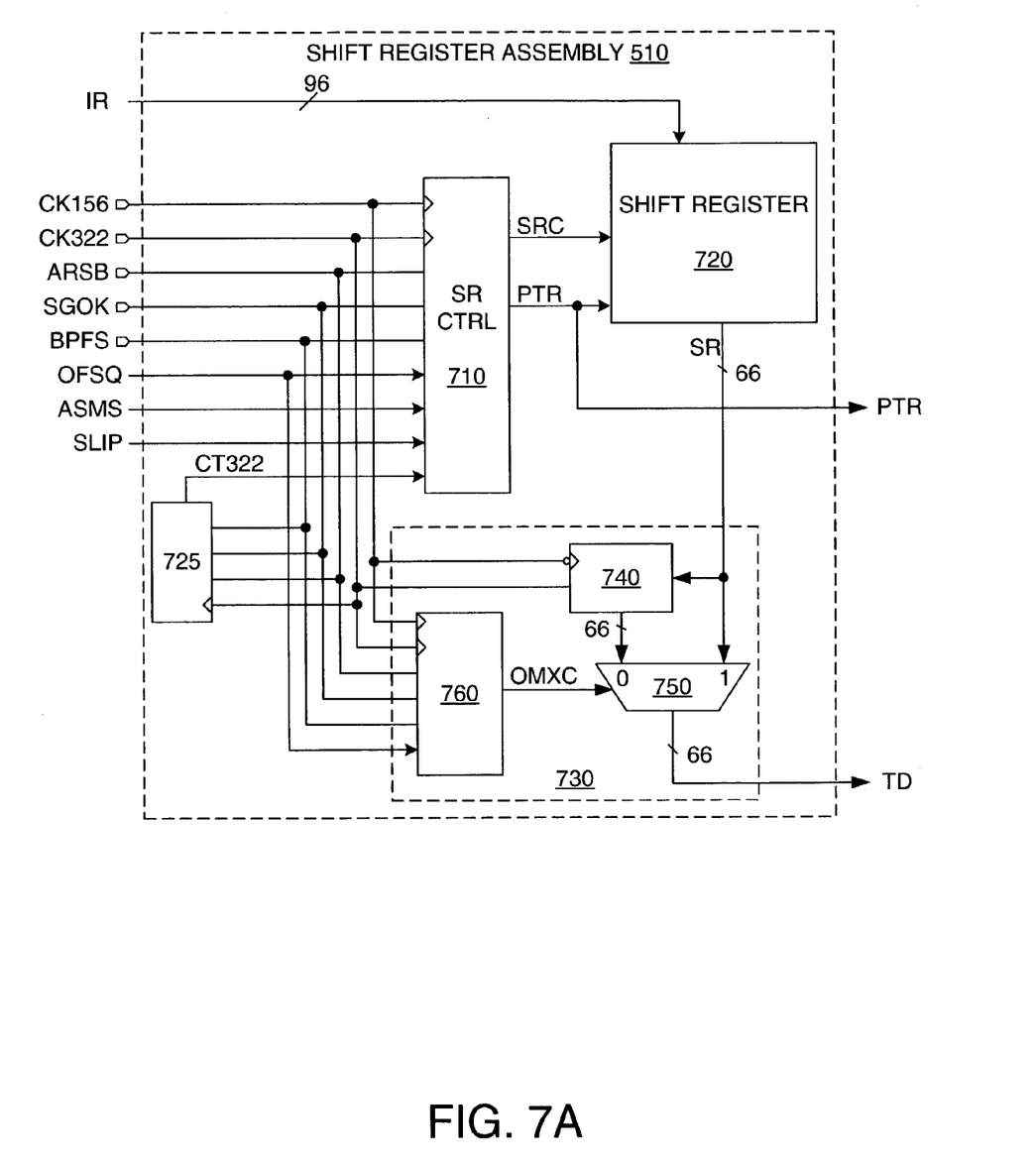
FIG. 7A is a block diagram of an embodiment of shift register assembly 520 of FIG. 5 that accumulates data from input registers 505 combining it into a data frame.

FIG. 7A is a block diagram of an embodiment of shift register assembly 510 of FIG. 5 that combines data from input registers 505 into frames of output data. Assembly 510 then synchronizes the assembled output data frames with the output clock CK156. Assembly 510 includes shift-register control logic 710, which shifts data into and out of a shift register 720 and generates and controls shift register pointer PTR. Shift register circuit 720 receives input data from a data bus IR in 64- or 96-bit chunks and reorganizes this data into 66-bit frames. Shift register 720 transmits shifts out the 66-bit frames to a transmit data circuit 730 via a shift-register output bus SR. Transmit data circuit 730 synchronizes the output data frames with output clock CK156 and transmits the resulting frames on a transmit data bus TD.

Control logic 710 receives both fast and slow clocks CK322 and CK156, respectively, and external reset signals including asynchronous reset ARSTB, sign-ok SGOK, and bypass frame synchronization BPFS. Control logic 710 additionally receives current state ASMS and off-sequence OFSQ signals from clock comparison circuit 515, and frame slip signal SLIP from frame verification circuit 525.

Unless reset, control logic 730 starts a shift-in operation on the rising edge of fast clock CK322. A counter 725 inhibits or enables shift-out operations. At power-up or after reset, counter circuit 725 increments a count signal CT322 at every rising edge of fast clock CK322 until count signal CT322 is equal to six. While count signal CT322 is less than six, counter circuit 725 inhibits shift-out operations to partially fill shift register 720. Pre-filling register 720 allows the amount of data stored in register 720 to fluctuate up and down to account for short-term differences in the input and output bandwidths of register 720.

Figure 7B:
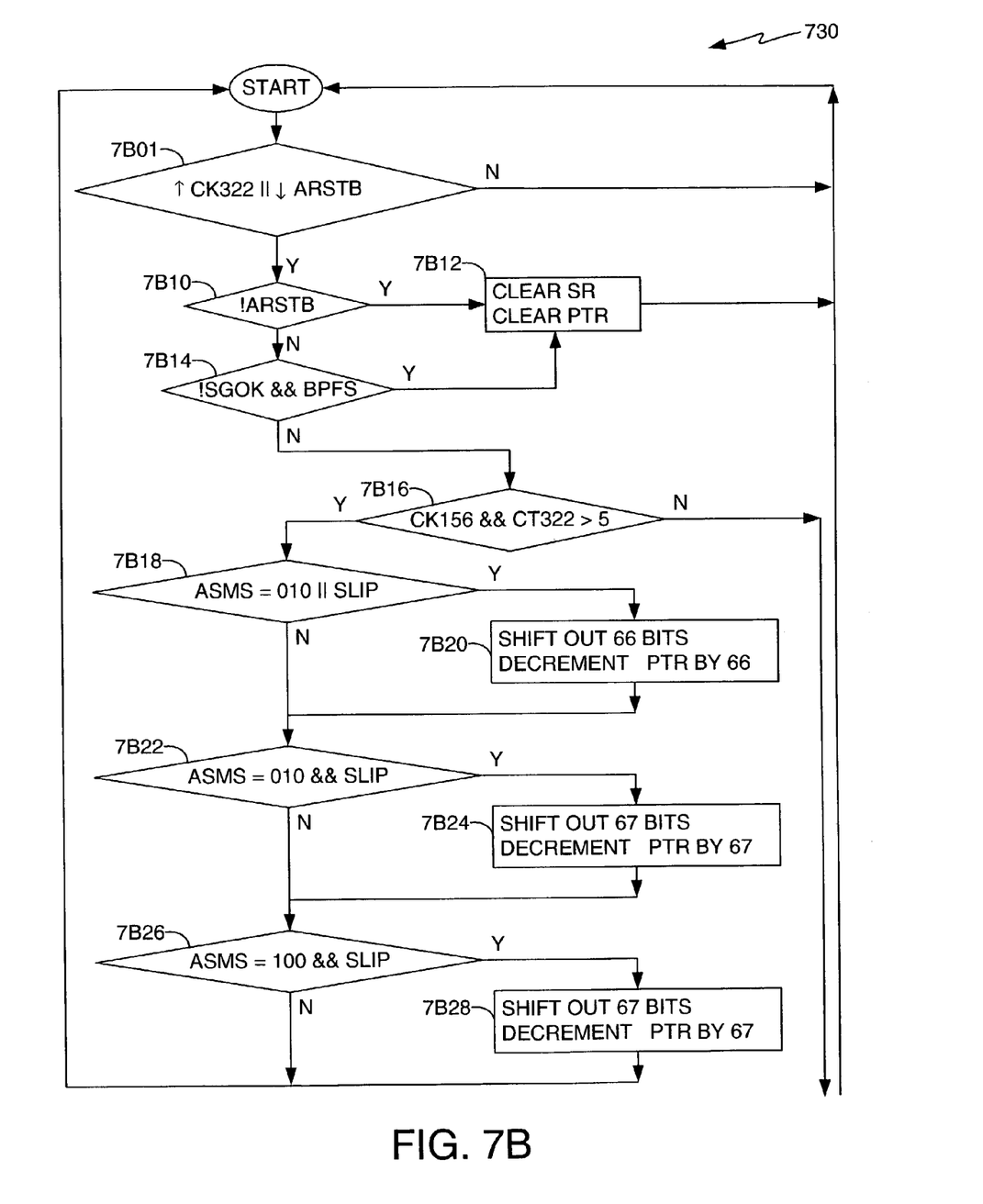
FIGS. 7B and 7C are a flowchart 730 depicting functional pseudo-code for shift-register control logic 710 (FIG. 7A) in accordance with one embodiment.
Figure 7C:
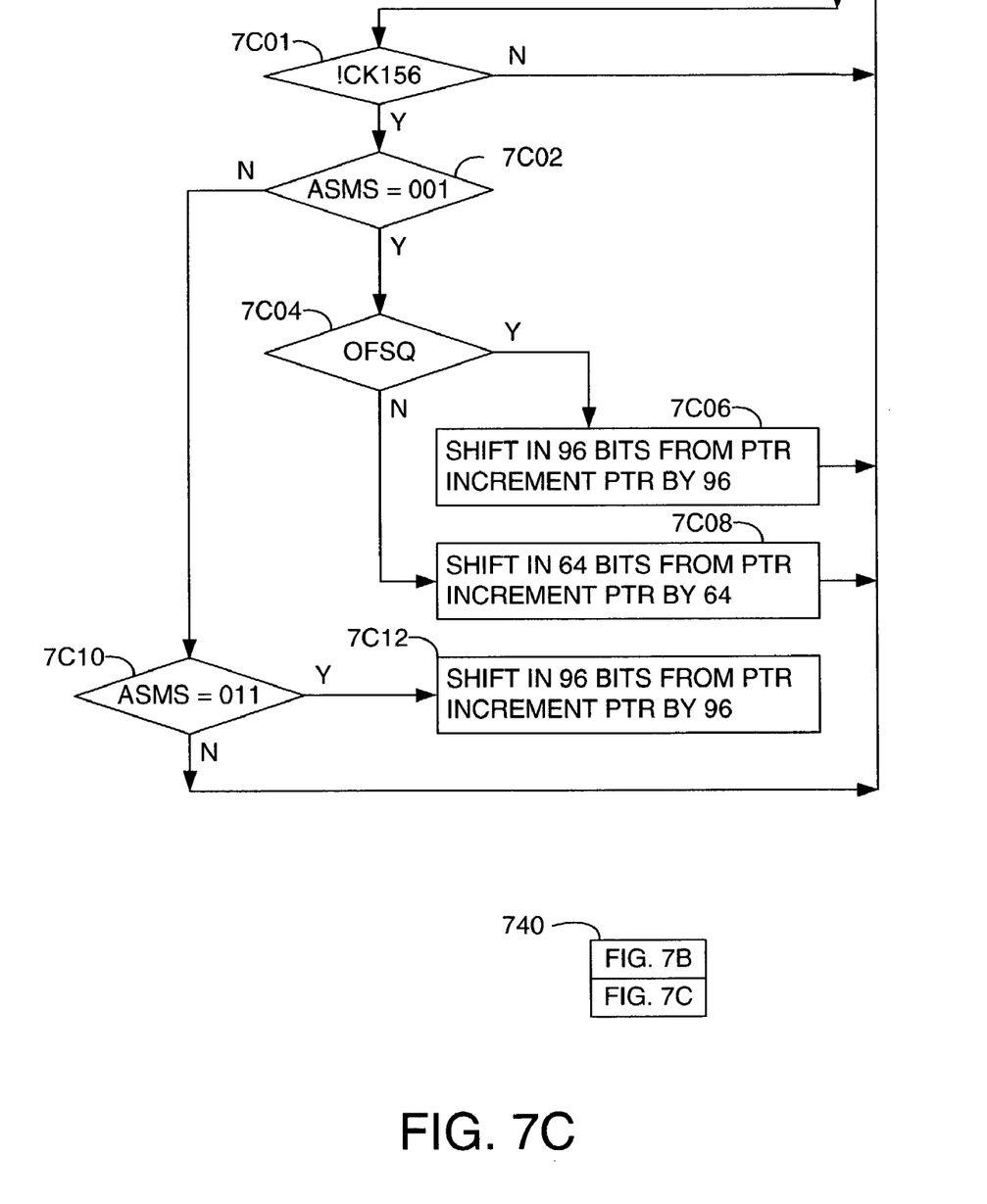

FIGS. 7B and 7C are a flowchart 730 depicting functional pseudo-code for shift-register control logic 710 (FIG. 7A) in accordance with one embodiment. A key 740 on FIG. 7C shows the relationship between FIGS. 7B and 7C. Control logic 710 is activated by either a rising edge on fast clock CK322 or a falling edge on asynchronous reset signal ARSTB (decision 7B01). Once active, control logic 710 first determines whether the reset signal ARSTB is asserted (decision 7B10); if so, control logic 710 clears shift register 720 and a register (not shown) generating the pointer SRPT (step 7B12). Control logic 710 also clears shift register 720 and the pointer if the signal-OK signal SGOK is de-asserted, an external signal indicating whether the input signal is corrupt, or the bypass-frame-sync signal BPFS is asserted (decision 7B14). Should control logic 720 make it through decision 7B14 without clearing the shift register and pointer, control logic 720 checks whether output clock CK156 is asserted and the value of a counter signal CT322 is greater than five (decision 7B16) to allow shift-out operations.

After a power-up or a reset operation (in which any of the resetting signals including ARSTB, SGOK, and BFS is active) all registers are reset/cleared as such there is no data in shift register 720. Once pre-filled, shift register 720 shifts out data every time a rising edge is detected on fast clock CK322 and slow clock CK156 is logic one (i.e., the fast clock samples a logic one on the slow clock). Shift register 720 shifts out data in every rising edge of clock CK322 if slow clock CK156 is logic zero. During shift-in operations, shift register 720 loads data from input registers 505 (FIG. 5) in blocks of 96 or 64 bits, beginning at the current pointer PTR address. During shift-out operations, shift register 720 transmits 66-bit data frames on shift register bus SR. Shift register control 710 increments or decrements pointer PTR as necessary to reflect data loaded into or shifted out of shift register 720.

Returning to decision 7B16 of FIG. 7B and following the shift-out operation (Y), the operation of assembly 510 depends upon current state ASMS and frame slip signal SLIP. Frame slip signal SLIP is asserted when data in shift register 720 forms an invalid data frame and all transmitted data are discarded by a receiving system. The SLIP mode continues until a valid data frame is detected in shift register 720.

When current state ASMS is 010 or slip signal SLIP is asserted (decision 7B18), shift register 720 shifts out a 66-bit data frame and decrements shift register pointer SRPT by 66 (step 7B20). When current state ASMS is 010 and frame slip signal SLIP is asserted (decision 7B22), shift register 720 shifts out a 67 bit data block and decrements shift register pointer SRPT by 67 (step 7B24). When current state ASMS is 100 and frame slip signal SLIP is asserted (decision 7B26), shift register 720 shifts out a 67 bit data block and decrements shift register pointer SRPT by 67 (step 7B28).

Moving on to FIG. 7C, when slow clock CK156 is not asserted (decision 7C01), control 710 monitors current state ASMS. When current state ASMS is 001 (decision 7C02), control circuit 710 determines whether off-sequence signal OFSQ is asserted (decision 7C04); if so, shift register 720 receives 96-bits of input data (three 32-bit input data) and shift register control 710 increments shift register pointer SRPT by 96 (step 7C06). Alternatively, if signal OFSQ is not asserted, shift register 720 receives 64-bits of input data (two 32-bit input data) and shift register control circuit 720 increments shift register pointer SRPT by 64 (step 7C08). When current state ASMS is 011 (decision 7C10), shift register 720 receives 96-bits of input data and shift register control circuit increments shift register pointer SRPT by 96 (step 7C12).

Transmit data circuit 730 receives shift register data on shift register bus SR on each rising edge of fast clock CK322 that samples a logic one on slow clock CK156. Transmit data circuit 730 stores the received data in a register 740 on every falling edge of fast clock CK322 and slow clock CK156 is a logic zero or transmits the data directly to transmit data mux 750. Transmit data mux 750 is controlled by transmit data control circuit 760, which includes a sequence counter (not shown).

Shift register 720 produces data at the output data rate, but in synchronization with the fast clock CK322. The data on bus SR must therefore be synchronized with the relatively slow output clock CK156. This synchronization is accomplished by output assembly 520, which is detailed below in connection with FIG. 8.

In normal operation, shift register 720 produces data on every rising edge of CK156. Occasionally, three 32-bit input datum are shifted into register 720 between output shifts, leading to the above-described "off-sequence" cases. The output of shift-register 720 is periodically retimed to ensure output assembly 520 captures the correct data.

The sequencer increments on every rising edge of CK322, providing off-sequence signal OFSQ is de-asserted. The sequencer resets to zero when off-sequence signal OFSQ is asserted. As long as the count within the sequencer is less than twenty-five, data control circuit 760 causes mux 750 to provide the output of register 740 on transmit-data bus TD; otherwise, data control circuit 760 and mux 750 provide the output of shift-register 720. The number twenty-five is selected in this embodiment so that when the rising edges of fast clock CK322 and slow clock CK156 coincide, stable data latched into register 740 when slow clock CK156 was a logic zero ("Low") is transmitted to transmit data bus TD. Transmit data mux 760 transmits selected input onto transmit data bus TD on the falling edge of slow clock CK156.

Figure 8:
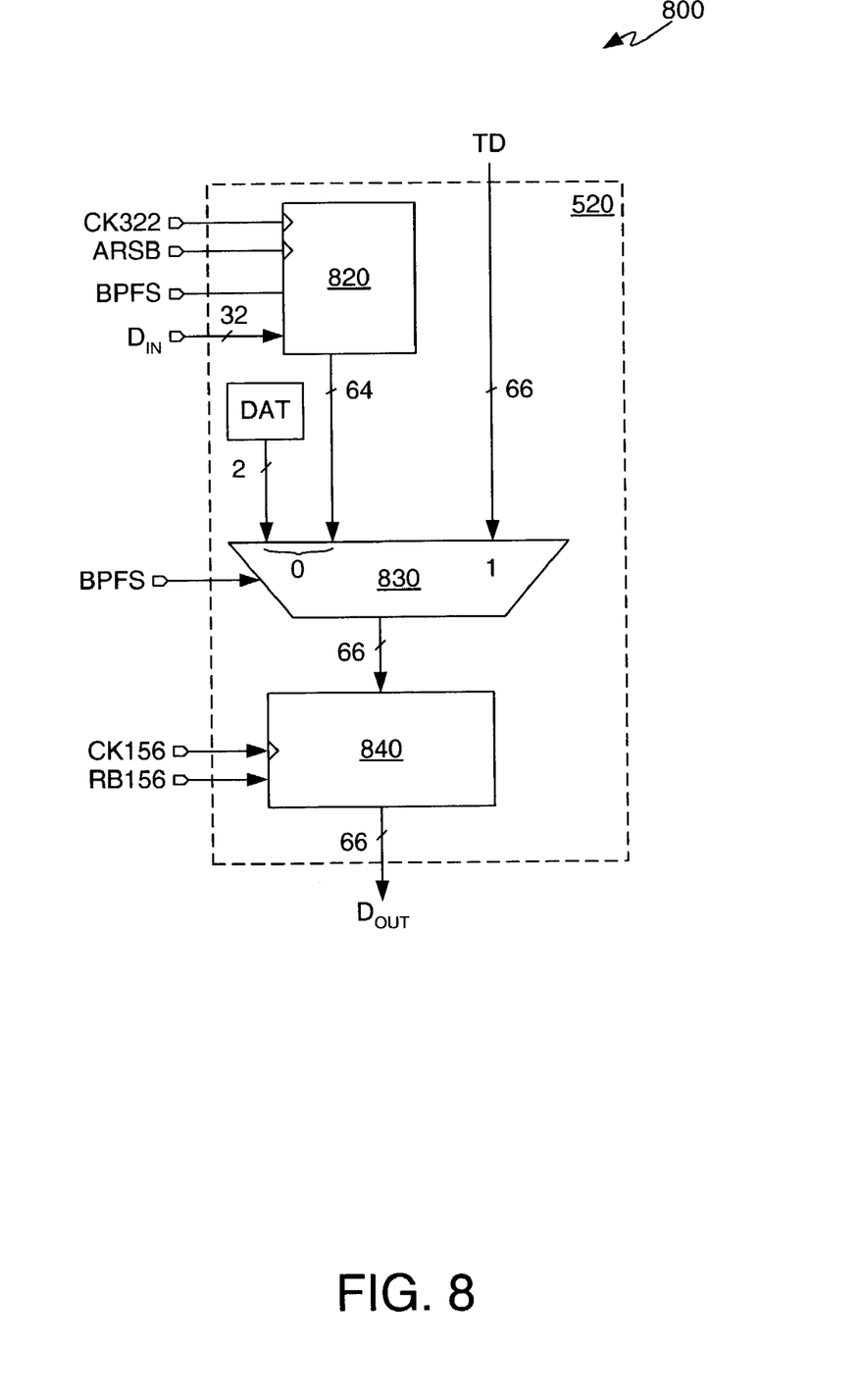
FIG. 8 is a block diagram 800 of output circuitry 520 in accordance with one embodiment.

FIG. 8 is a block diagram 800 of output assembly 520 in accordance with one embodiment that either transmits synchronized or input data from a fast clock domain to a slow clock domain. Block 800 includes a bypass register 820 receiving the 32-bit input data stream on input data bus $D_{IN}$, and a bypass frame-sync signal BPFS. When bypass frame-sync signal BPFS is asserted, an output mux 830 transmits bypass register 820 data padded with 2-bit as least-significant bits; however, if bypass frame-sync signal BPFS is not asserted, output mux 830 selects transmits a data frame on transmit data bus TD. An output register 840 synchronizes transmitted data, receiving data from output mux 830 on the rising edge of slow clock CK156 and transmitting the data on an output data bus $D_{OUT}$. Output register 840 additionally receives a reset signal RB156 based on the 156 time domain.

While the present invention has been described in connection with specific embodiments, variations of these embodiments will be obvious to those of ordinary skill in the art. Moreover, some components are shown directly connected to one another while others are shown connected via intermediate components. In each instance the method of interconnection establishes some desired electrical communication between two or more circuit nodes, or terminals. Such communication may often be accomplished using a number of circuit configurations, as will be understood by those of skill in the art. Therefore, the spirit and scope of the appended claims should not be limited to the foregoing description.

What is claimed is:

1. An asynchronous first-in, first-out (FIFO) buffer communicating between first and second clock domains, the FIFO buffer comprising:
   a. an input clock terminal receiving an input clock signal of an input clock frequency associated with the first clock domain;
   b. an output clock terminal receiving an output clock signal of an output clock frequency associated with the second clock domain;
   c. clock-comparison and write logic having:
      i. a first clock-comparison-circuit input node receiving the input clock signal;
      ii. a second clock-comparison-circuit input node receiving the output clock signal; and
      iii. a write-control node;
      iv. wherein the clock-comparison and write logic compares the input clock signal with the output clock signal to produce a write signal on the write-control node; and
   d. a shift register having:
      i. a shift-register input port;
      ii. a shift-register output port; and
      iii. a write terminal connected to the write-control node of the clock-comparison and write logic, wherein the clock-comparison and write logic provides an address pointer to the shift register, the address pointer having a address value that varies based on the comparing of the input and output clock signals.

2. The FIFO buffer of claim 1, wherein the clock-comparison and write logic samples one of the input and output clock signals with the other of the input and output clock signals.

3. The FIFO buffer of claim 1, wherein the input clock signal is of a first frequency and the output clock signal is of a second frequency different from the first frequency.

4. The FIFO buffer of claim 3, wherein the higher of the first and second frequencies is not an integer multiple of the lower of the first and second frequencies.

5. The FIFO buffer of claim 1, further comprising a plurality of input registers connected in parallel to a data input bus and having respective input-register output ports connected to the shift register, each input register having an input-register control terminal connected to the clock-comparison and write logic and a data output port connected to the shift register.

6. The FIFO buffer of claim 5, wherein the wherein the clock-comparison and write logic enables one of the plurality of input registers based on the comparing of the input and output clock signals.

7. The FIFO buffer of claim 1, wherein the clock-comparison and write logic includes a state machine that cycles through a plurality of states, and wherein the state machine transitions from a current state to a next state base in part on the comparing of the input and output clock signals.

8. The FIFO buffer of claim 7, wherein the clock-comparison and write logic generates the write signal based on the current state.

9. The FIFO buffer of claim 1, further comprising an output assembly connected to the shift-register output port and receiving data shifted from the shift register, the output assembly receiving the output clock signal and synchronizing the data from the shift register with the output clock signal.

10. The FIFO buffer of claim 1, further comprising a frame verification circuit for determining data frame validity.

11. A system for converting an input data stream including a succession of input datum synchronized with an input clock signal to an output data stream including a succession of output datum synchronized with an output clock signal, the system comprising:
 a. a shift register receiving an input pointer and the succession of input datum, the shift register storing each input datum at a shift-register address location indicated by the input pointer;
 b. a clock-comparison circuit comparing one of the input clock signal and the output clock signal with the other of the input clock signal and output clock signal;
 c. write logic connected to the clock-comparison circuit and the shift register, the write logic generating a write signal and the input pointer in response to the comparing; and
 d. wherein the write signal enables the storing of each input data at the shift-register address location indicated by the input pointer.

12. The system of claim 11, wherein the shift register further comprises a shift-register output port shifting out the succession of output datum synchronized with the second clock signal.

13. The system of claim 11, wherein the clock-comparison circuit compares the clock signals by sampling one of the input and output clock signals with the other of the input and output clock signals to obtain a clock sample.

14. The system of claim 13, wherein the clock-comparison circuit uses the clock sample to determine whether to write one of the input datum to the shift register.

15. The system of claim 11, wherein the clock-comparison circuit includes a state machine transitioning through a plurality of states, and wherein a current one of the states determines whether one of the input datum is written into the shift register.

16. A method of transferring data from an input clock domain synchronized with an input clock signal to an output clock domain synchronized to an output clock signal, the method comprising:
 storing the data in synchronization with the input clock signal;
 comparing the state of the input clock signal with the state of the output clock signal to determine the chances of state of the input clock signal during each output clock cycle; and
 writing the stored data into a shift register during an output clock cycle based upon the chances of state of the input clock signal during the output clock cycle.

17. The method of claim 16, wherein the comparing includes sampling one of the input and output clock signals with the other of the input and output clock signals.

18. The method of claim 16, further comprising maintaining a memory pointer indicating an address at which to store the data.

19. The method of claim 18, further comprising updating the memory pointer in response to the comparing.

20. The method of claim 16, further comprising periodically repeating the comparing, each comparing producing a sample, and maintaining state data based at least in part on the samples.

* * * * *